United States Patent
Loomans-V. D. Anker et al.

(10) Patent No.: US 7,380,671 B2
(45) Date of Patent: Jun. 3, 2008

(54) PROCESS FOR SIZE CLASSIFYING AMMONIUM SULFATE CRYSTALS WHICH ARE PRESENT IN A SUSPENSION

(75) Inventors: Natasja Anouk Loomans-V. D. Anker, Roermond (NL); Andreas Oliver Mittenzwei, Maastricht (NL); Bernd Roman Keller, Born (NL); Lianne Van Oord, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/474,439

(22) PCT Filed: Apr. 5, 2002

(86) PCT No.: PCT/NL02/00222

§ 371 (c)(1),
(2), (4) Date: Jul. 21, 2004

(87) PCT Pub. No.: WO02/081374

PCT Pub. Date: Oct. 17, 2002

(65) Prior Publication Data

US 2005/0006503 A1    Jan. 13, 2005

(30) Foreign Application Priority Data

Apr. 9, 2001  (EP) .................. 01201312

(51) Int. Cl.
*B07B 1/22*    (2006.01)
*B07C 3/04*    (2006.01)
(52) U.S. Cl. .............. 209/270; 209/44.3; 209/305; 209/306; 422/254
(58) Field of Classification Search ............. 209/305, 209/306, 270, 44.3, 386; 210/757; 422/254
See application file for complete search history.

(56) References Cited

U.S. PATENT DOCUMENTS

| 2,203,405 | A | * | 6/1940 | Weimer et al. | ............... 209/44 |
| 2,883,273 | A |   | 4/1959 | Saeman |  |
| 3,006,470 | A | * | 10/1961 | Franken | ...................... 209/132 |
| 3,490,585 | A | * | 1/1970 | Gooding et al. | ............... 209/5 |
| 4,042,503 | A | * | 8/1977 | Justus | ........................ 209/240 |
| 4,357,306 | A |   | 11/1982 | Takács et al. |  |

(Continued)

FOREIGN PATENT DOCUMENTS

DE    926 244    4/1955

(Continued)

OTHER PUBLICATIONS

Patent Abstracts of Japan, JP-04-026512.

(Continued)

*Primary Examiner*—Patrick Mackey
*Assistant Examiner*—Terrell Matthews
(74) *Attorney, Agent, or Firm*—Nixon & Vanderhye P.C.

(57) ABSTRACT

The invention relates to a process for size classifying ammonium sulfate crystals using a screen, said process comprising feeding a feed suspension to the screen, said feed suspension comprising said ammonium sulfate crystals in an ammonium sulfate solution, size classifying the ammonium sulfate crystals, and keeping both sides of the screen immersed in liquid during said size classifying.

17 Claims, 1 Drawing Sheet

U.S. PATENT DOCUMENTS

| | | | |
|---|---|---|---|
| 5,392,921 A * | 2/1995 | Stengel, III | 209/17 |
| 6,530,481 B1 * | 3/2003 | Bergdahl et al. | 209/17 |
| 2003/0155279 A1 * | 8/2003 | Monjarret | 209/132 |

FOREIGN PATENT DOCUMENTS

| EP | 0 577 213 | 1/1994 |
|---|---|---|
| GB | 1 134 963 | 11/1968 |

OTHER PUBLICATIONS

Derwent Abstracts, JP 4026512.

Patent Abstracts of Japan, Publication No. 03150271, English abstract of JP 01287778, filed Nov. 7, 1989.

* cited by examiner

PROCESS FOR SIZE CLASSIFYING AMMONIUM SULFATE CRYSTALS WHICH ARE PRESENT IN A SUSPENSION

CROSS REFERENCE TO RELATED APPLICATION

This application is the National Phase of International Application PCT/NLO02/00222filed Apr. 5, 2002 which designated the U.S., and that International Application was published under PCT Article 21(2) in English.

The invention relates to a process for size classifying ammonium sulfate crystals using a screen, said process comprising feeding a feed suspension to the screen, said feed suspension comprising said ammonium sulfate crystals in an ammonium sulfate solution, and size classifying the ammonium sulfate crystals.

Processes for size classifying ammonium sulfate crystals are described in JP-A-3150217 and in JP-A-426512. In the known processes a suspension which originates from a crystallizer and which comprises ammonium sulfate solution and ammonium sulfate crystals is supplied to a screen. Using the screen the suspension is separated in a coarse crystal fraction and into a fine crystal fraction. The fine crystal fraction is recycled to the crystallizer, the coarse crystal fraction being subjected to drying to obtain ammonium sulfate product crystals.

The known processes have the disadvantage that they are sensitive to clogging of the openings of the screen by ammonium sulfate crystals, which results in a less effective separation.

The goal of the invention is to provide a process in which the clogging of openings is prevented or at least reduced to a considerable extent.

This goal is achieved according to the invention by keeping both sides of the screen immersed in liquid during said size classifying.

According to the invention a feed suspension comprising the ammonium sulfate crystals to be size classified, is fed to the screen. The size classifying according to the invention results in a permeate suspension and a product suspension which may be withdrawn from the screen. The permeate suspension comprises ammonium sulfate crystals which have been transported through the openings of the screen, and ammonium sulfate solution which has been transported through the openings of the screen. The product suspension comprises ammonium sulfate crystals which have not been transported through the openings of the screen and ammonium sulfate solution which has not been transported through the openings of the screen.

According to the invention both sides of the screen are kept immersed in liquid. As used herein, keeping both sides of the screen immersed in liquid is intended to mean that the side of the screen to which the feed suspension is fed, as well as the side of the screen from which the permeate suspension is withdrawn, are kept immersed in liquid. As a result of said immersing contact of the screen with air, and in particular the openings of the screen with air is prevented. Without wishing to be bound by any scientific theory it is believed that this prevents or at least reduces the occurrence of crystallization of ammonium sulfate from the ammonium sulfate solution, and as a result reduces clogging of the openings of the screen. The liquid in which both sides of the screen are kept immersed is preferably an ammonium sulfate solution and/or a suspension comprising ammonium sulfate crystals in an ammonium sulfate solution.

Both sides of the screen may be kept immersed in liquid by any suitable method, preferably by choosing and/or controlling the flow rate of the feed suspension, the flow rate of the permeate suspension and/or the flow rate of product suspension relative to each other, such as to keep both sides of the screen immersed in liquid. This may be done by any suitable method, for instance by using inlets and outlets for having the appropriate dimensions, by using overflows or by using one or more adjustable valves.

Preferably, use is made of a screening apparatus comprising a first chamber, a second chamber and the screen, the screen forming a partition between the first chamber and the second chamber, wherein the process comprises feeding feed suspension into the first chamber, withdrawing the permeate suspension from the second chamber, and withdrawing the product suspension from the first chamber. When using such screening apparatus both sides of the screen can be immersed in liquid in an effective way. The screen may separate the first chamber and the second chamber in any suitable way. The screening apparatus may comprise a housing, the screen dividing the housing into the first chamber and the second chamber. The apparatus may also comprise an inner vessel, for instance a tube, the wall of said inner vessel including the screen, and an outer vessel, wherein the part of the wall of the inner vessel comprising the screen is surrounded by the outer vessel. Preferably, one end of the inner vessel, in particular one end of the tube, extends through a wall of the outer vessel.

Preferably, the feed suspension being fed to the screen comprises less than 50 vol. %, more preferably less than 40 vol. %, in particular less than 30 vol. %, more in particular less than 25 vol. % ammonium sulfate crystals, relative to the volume of the feed suspension. When the abovementioned screening apparatus is used, the feed suspension being fed into the first chamber preferably comprises less than 50 vol. %, more preferably less than 40 vol. %, in particular less than 30 vol. %, more in particular less than 25 vol. % ammonium sulfate crystals, relative to the volume of the feed suspension. Decreasing the percentage of crystals in the feed suspension has the advantage that transport is facilitated and that a higher percentage of fine crystals may be separated without the screen running dry. There is no specific lower limit for the percentage crystals in the feed suspension. Generally, the percentage of crystals in the feed suspension fed to the screen is higher than 0.1 vol. %, preferably higher than 0.5 vol. %, more preferably higher than 1 vol. %, in particular higher than 2 vol. %, relative to the volume of the feed suspension.

Preferably, the product suspension being withdrawn from the screen comprises less than 70 vol. %, more preferably less than 60 vol. %, in particular less than 50 vol. %, more in particular less than 40 vol. % ammonium sulfate crystals, relative to the volume of the product suspension. When the abovementioned screening apparatus is used, the product suspension withdrawn from the second chamber preferably comprises less than 70 vol. %, more preferably less than 60 vol. %, in particular less than 50 vol. %, more in particular less than 40 vol. % ammonium sulfate crystals, relative to the volume of the product suspension. Decreasing the percentage of crystals in the product suspension has the advantage that transport of the product suspension is facilitated.

The ammonium sulfate concentration in the aqueous ammonium sulfate solution is not limited to a specific value. Generally, the ammonium sulfate solution contains at least 1 wt. % of dissolved ammonium sulfate, preferably at least 5 wt. %, more preferably at least 10 wt. %, in particular at least 20 wt. %, more in particular at least 30 wt. %., relative to the weight of the ammonium sulfate solution. Generally, the ammonium sulfate concentration is lower than 60 wt. %, preferably lower than 50 wt. %, more preferably lower than 45 wt. %, relatave to the weight of the ammonium sulfate solution.

Preferably, transport of the suspension at the side of the screen to which the feed suspension is fed takes place in a direction essentially parallel to the screen. When the abovementioned screening apparatus is used, transport of the suspension in the first chamber preferably takes place in a direction essentially parallel to the screen. This has the advantage that blocking of the openings by ammonium sulfate crystals is further reduced. Preferably, transport of the suspension at the side of the screen to which the feed suspension is fed (when the abovementioned screening apparatus is used, in the first chamber) takes place at a rate of at least 0.01 m/s in a direction parallel to the screen, more preferably at least 0.05 m/s, in particular at least 0.1 m/s, more in particular at least 0.25 m/s. Increasing the flow rates facilitates removal of ammonium sulfate crystals from the screen.

Preferably, the process comprises wiping off ammonium sulfate crystals from the screen with mechanical means, preferably at the side of the screen to which the feed suspension is fed. This further facilitates removal of ammonium sulfate crystals from the screen. Examples of suitable mechanical means include scraping means, an agitator, a rotating screw. When the abovementioned screening apparatus is used, the mechanical means are preferably inside the first chamber. In a preferred embodiment, at least part of the wall of the first chamber forms a cylinder, said cylindrical part including at least part of the screen, wherein the mechanical means are inside the first chamber and wherein said mechanical means (e.g. scraping means, agitator, screw) can be rotated around an axis parallel to the length axis of the cylinder. A Russel Eco Self Cleaning Filter® may advantageously be used.

The size classifying includes transport of ammonium sulfate crystals having a sufficiently small size through the openings of the screen. Ammonium sulfate crystals to which the openings of the screen are permeable, i.e. ammonium sulfate crystals having a sufficiently small size that they can permeate through the openings of the screen, can be referred to as fine crystals and/or as crystals below a predetermined size. Ammonium sulfate crystals to which the openings of the screen are not permeable, i.e. ammonium sulfate crystals having such size that they cannot permeate through the openings of the screen, can be referred to as coarse crystals and/or crystals above the predetermined size. When feeding a feed suspension comprising fine crystals and coarse crystals to the screen, at least part of the fine crystals are separated from the coarse crystals as a result of the size classifying.

The dimensions of the openings of the screen are not limited to a specific value or to any shape. Preferably the openings of the screen have such dimensions that they are permeable to crystals having a diameter of 0.05 mm, more preferably at least 0.1 mm, in particular at least 0.2 mm, and more in particular at least 0.5 mm. Preferably, the diameter of the openings of the screen is at least 0.05 mm, more preferably 0.1 mm, in particular 0.2 mm, and more in particular 0.5 mm. Preferably, the openings of the screen have such dimensions that they are not permeable to crystals having a diameter of 10 mm, more preferably 5 mm, most preferably 2 mm.

Preferably, the feed suspension originates from a crystallizer. Preferably, at least part of the permeate suspension is fed to a crystallizer.

Optionally ammonium sulfate solution originating from the permeate suspension and/or product suspension, e.g. separated by filtration, is introduced into the feed suspension and/or introduced into the first chamber, preferably via the feed suspension. This has the advantage that concentration ammonium sulfate crystals in the feed suspension is decreased.

DESCRIPTION OF A PREFERRED EMBODIMENT

Figure 1:
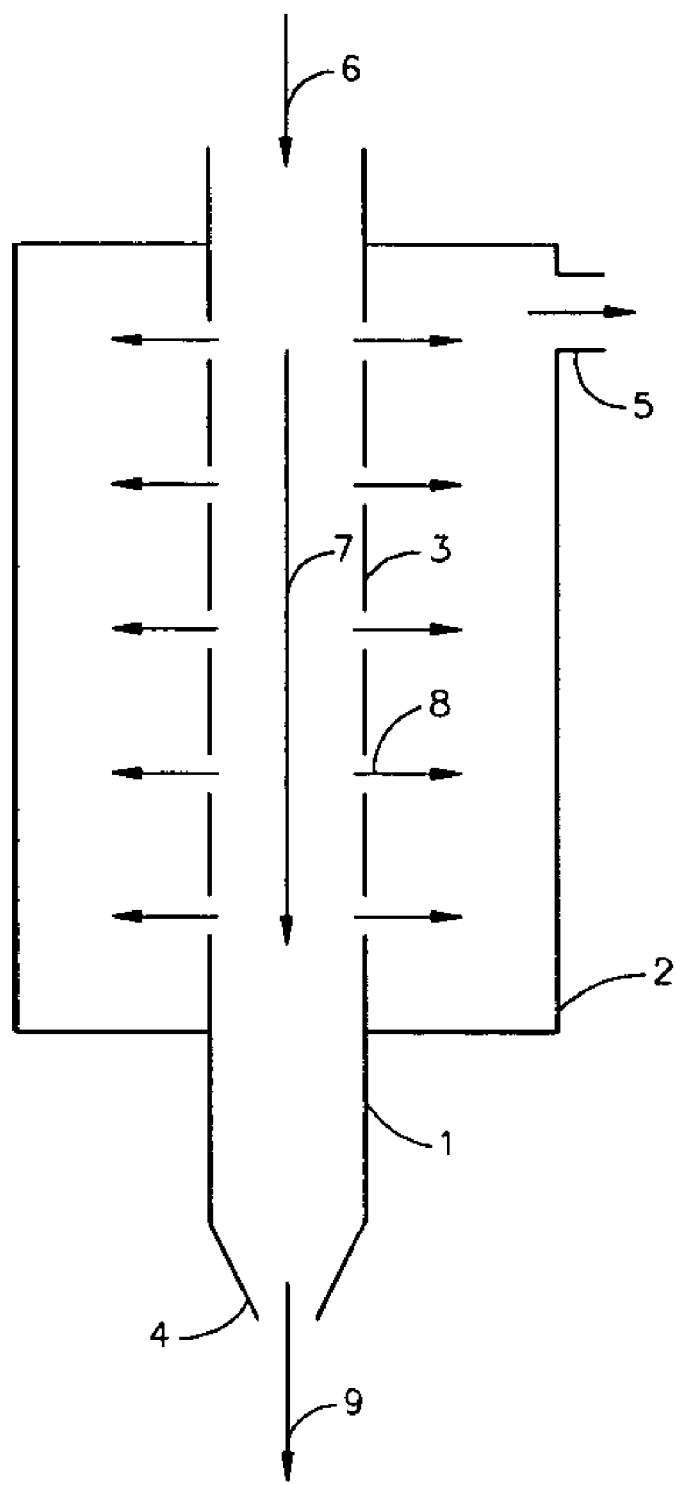
FIG. 1 is a schematic diagram of a preferred embodiment of the process according to the invention.

In this preferred embodiment, use is made of an apparatus (see FIG. 1) comprising an inner tube 1 (the first chamber) and an outer tube 2 (second chamber). In the outer tube 2 is an outlet 5. The screen 3 is located in the wall of the inner tube 1. A narrowing 4 is located at the bottom of the apparatus. The joining point of the inner tube 1 and the outer tube 2 is sealed via a liquid-tight seal. The feed suspension 6 enters the inner tube 1 through the top. The suspension 7 then flows along the screen 3. Fine ammonium sulfate crystals and ammonium sulfate solution 8 travel through the openings into outer tube 2 and leaves the outer tube 2 through outlet 5. The stream exiting outlet 5 is the permeate suspension. The product suspension 9 leaves the inner tube 1 through the bottom. The apparatus may be placed in a vertical position but this is not necessary.

The invention is illustrated by the following examples without being limited thereto.

EXAMPLE I

A feed suspension of 19% by weight ammonium sulfate crystals in an aqueous ammonium sulfate solution, (43% by weight ammonium sulfate dissolved in water) as the continuous phase, was classified using the apparatus shown in FIG. 1. The inner tube 1 was a metal tube of 25 mm inside diameter. In the wall of this tube there were located over a length of 20 cm four rows of slits 1.4 mm wide and 5 cm long. The slits were spaced about 1 mm apart. The longitudinal direction of the slits was parallel to the longitudinal direction of the inner tube. An adjustable valve was used for the narrowing at the bottom of the inner tube. The outer tube 2 had an inside diameter of about 30 cm. The feed suspension was supplied through the inner tube from the top at the flow rate of 3 m$^3$ per hour. The streams were controlled so that the flow rate of the product suspension was equal to the flow rate of the permeate suspension. Samples were taken of both the feed suspension and the product suspension. The samples were analysed as follows.

1. The sample was filtered with the aid of a "Buchner funnel".
2. The crystals obtained were washed with wash liquor consisting of 36.2% by weight methanol, 54.5% by weight water with 9.3% by weight dissolved ammonium sulfate.
3. The crystals were washed twice with methanol.
4. The crystals were washed with diethyl ether.
5. The crystals were dried at a temperature of 40° C.

Table 1 shows the particle size distribution of the ammonium sulfate crystals in the feed suspension and the particle size distribution of the ammonium sulfate crystals in the product suspension. The amount of crystals with diameter <1.25 mm had been reduced by the process of the invention by 37%.

EXAMPLE II

The procedure described in Example I was repeated. In this instance the feed suspension contained 4% by weight ammonium sulfate crystals.

The results are shown in Table 1. The amount of crystals with a diameter <1.25 mm had decreased by 52%.

EXAMPLE III

The procedure described in Example I was repeated. The ammonium sulfate suspension to be classified contained 8.5% by weight ammonium sulfate crystals. On being rid of solids by filtration, the permeate suspension was added to the ammonium sulfate suspension so that a feed suspension containing 4.3% by weight ammonium sulfate crystals was obtained. The flow rate of the feed suspension was 1.9 m$^3$/h. The streams were controlled so that the flow rate of the product suspension was equal to the flow rate of the permeate suspension.

The results are shown in Table 1. The amount of particles with a diameter <1.25 mm had decreased by 50%.

Examples I to III can be continued with no or only limited occurrence of clogging of openings in the screen. When examples I to III are repeated with the difference that both sides of the screen are not immersed in liquid (as a comparative experiment), the process has to be interrupted due to the occurrence of clogging and crystallization on the screen.

EXAMPLE IV

A feed suspension of 6.5% by weight ammonium sulfate crystals in an ammonium sulfate solution, with 43% by weight dissolved ammonium sulfate as the continuous phase, was classified using the apparatus shown in FIG. 1, but is in this case provided with an agitator, being a screw. The inner tube 1 was a metal tube of 107 mm inside diameter. In the wall of this tube there were located over the total length of 37.2 cm slits of 1.4 mm wide. The slits were spaced about 1 mm apart. The longitudinal direction of the slits was parallel to the longitudinal direction of the inner tube. The outer tube 2 had an inside diameter of about 17 cm.

The feed suspension was supplied through the inner tube from the top at the flow rate of 23 m$^3$ per hour. The streams were controlled so that the flow rate of the product suspension was equal to the flow rate of the permeate suspension. Samples were taken of both the permeate suspension and the product suspension. The samples were analysed as follows.

1. The sample was filtered with the aid of a "Buchner funnel".
2. The crystals obtained were washed with wash liquor consisting of 36.2% by weight methanol, 54.5% by weight water with 9.3% by weight dissolved ammonium sulfate.
3. The crystals were washed twice with methanol.
4. The crystals were dried at a temperature of 40° C.
5. The particle size distribution of the crystals was determined with sieve analysis.

Table 2 shows the particle size distribution of the ammonium sulfate crystals in the permeate suspension and the particle size distribution of the ammonium sulfate crystals in the product suspension. Table 3 shows the total concentration of crystals in the feed and in the product suspension and the mass flow of fines coming with each stream. The amount of crystals with diameter <1.4 mm had been reduced by the process of the invention by 49%.

EXAMPLE V

The procedure described in Example IV was repeated. In this instance the feed suspension contained 5.4% by weight ammonium sulfate crystals, while the opening of the slits amounted 0.5 mm. The feed flow amounted 21 m$^3$/h. The streams were controlled so that the flow rate of the product suspension was equal to the flow rate of the permeate suspension.

The results are shown in Table 2 and Table 3. The amount of crystals with a diameter <0.5 mm had decreased by 60%.

EXAMPLE VI

The procedure described in Example IV was repeated. The ammonium sulfate suspension to be classified contained 26% by weight ammonium sulfate crystals. The flow rate of the feed suspension was 14 m$^3$/h and the slit opening was 0.5 mm. The streams were controlled so that the flow rate of the product suspension was 1.5 times the flow rate of the permeate suspension.

The results are shown in Table 2 and Table 3. The amount of particles with a diameter <0.5 mm had decreased by 39%.

TABLE 1

| Particle size, d (in mm) | Example I feed susp. % wt relative to total solids weight | Example I product susp. % by weight relative to total solids weight | Example II feed susp. % by weight relative to total solids weight | Example II product susp. % by weight relative to total solids weight | Example III feed susp. % by weight relative to total solids weight | Example III product stream % by weight relative to total solids weight |
|---|---|---|---|---|---|---|
| d > 3.35 | 6.82 | 6.09 | 2.19 | 4.06 | 3.6 | 4.7 |
| 2.0 < d < 3.35 | 61.96 | 65.43 | 48.19 | 57.4 | 20.6 | 26.4 |
| 1.7 < d < 2.0 | 17.04 | 17.05 | 22.26 | 21.05 | 19.2 | 24.4 |
| 1.4 < d < 1.7 | 7.25 | 6.72 | 11.62 | 9.24 | 21.5 | 25.2 |
| 1.25 < d < 1.4 | 2.3 | 1.83 | 4.27 | 2.76 | 7 | 5.3 |
| 0.8 < d < 1.25 | 3.28 | 2.12 | 7.19 | 3.69 | 18.3 | 9.9 |
| 0.4 < d < 0.8 | 1.18 | 0.64 | 3.63 | 1.55 | 8.7 | 3.7 |

TABLE 1-continued

| | | | | | | |
|---|---|---|---|---|---|---|
| d < 0.4 | 0.17 | 0.12 | 0.65 | 0.25 | 1.1 | 0.4 |
| d < 1.25 mm | 4.6 | 2.9 | 11.5 | 5.5 | 28.1 | 14.0 |

| | Example I feed suspension | Example I product suspension | Example II feed suspension | Example II product suspension | Example III feed suspension | Example III product suspension |
|---|---|---|---|---|---|---|
| % by weight solids relative to sum of liquid + solids | 19 | 40 | 4 | 8 | 4 | 7 |

TABLE 2

| particle size, d (in mm) | Example IV permeate susp. % by weight relative to total solids weight | Example IV product susp. % wt relative to total solids weight | Example V permeate susp. % by weight relative to total solids weight | Example V product susp. % by weight relative to total solids weight | Example VI permeate susp. % by weight relative to total solids weight | Example VI product stream % by weight relative to total solids weight |
|---|---|---|---|---|---|---|
| d > 1.7 | 0.72 | 13.69 | 0 | 0.28 | 0.01 | 17.77 |
| d < 1.7 | 99.28 | 86.31 | 100 | 99.72 | 99.99 | 82.23 |
| d < 1.12 | 59.55 | 38.35 | 99.6 | 62.49 | 99.93 | 55.2 |
| d < 0.8 | 34.52 | 20.67 | 97.89 | 33.83 | 99.34 | 38.07 |
| d < 0.6 | 20.53 | 12.52 | 85.15 | 19.03 | 91.18 | 25.56 |
| d < 0.425 | 11.39 | 7.3 | 50.4 | 9.76 | 60.95 | 13.75 |
| d < 0.2 | 2.8 | 1.82 | 11.97 | 2.35 | 18.06 | 2.83 |

TABLE 3

| | Example IV feed suspension | Example IV product suspension | Example V feed suspension | Example V product suspension | Example VI feed suspension | Example VI product suspension |
|---|---|---|---|---|---|---|
| % by weight solids relative to sum of liquid + solids | 6.5 | 8.2 | 5.4 | 7.4 | 26 | 38 |
| Mass flow of fines kg/h | 1642 | 844 | 343 | 138 | 1386 | 846 |

The invention claimed is:

1. Process for size classifying ammonium sulfate crystals, said process comprising the steps of:
   (a) providing a screen having screen openings within a vessel so as to establish first and second volumes within the vessel on respective first and second sides of the screen;
   (b) feeding to the first side of the screen an ammonium sulfate feed suspension comprised of an ammonium sulfate solution containing ammonium sulfate crystals, the ammonium sulfate crystals comprised of coarse ammonium sulfate crystals having diameters sufficiently large to prevent passage through the openings of the screen and fine ammonium sulfate crystals having diameters sufficiently small to allow passage through the openings of the screen; and
   (c) while simultaneously maintaining the first and second sides of the screen immersed in contact with the ammonium sulfate solution, size classifying the ammonium sulfate crystals based on crystal diameters by allowing a substantial part of the fine crystals to pass through the openings of the screen to the second volume of ammonium sulfate solution within the vessel on the second side of the screen while the coarse ammonium sulfate crystals are retained in the first volume of ammonium sulfate solution within the vessel on the first side of the screen.

2. Process according to claim 1, further comprising:
   (d) withdrawing a portion of the second volume of ammonium sulfate solution as a permeate suspension comprised of the fine ammonium sulfate crystals in an ammonium sulfate solution from the second side of the screen, and
   (e) withdrawing a portion of the first volume of ammonium sulfate solution as a product suspension comprised of the coarse ammonium sulfate crystals in an ammonium sulfate solution from the first side of the screen.

3. Process according to claim 2, comprising:
   providing a screening apparatus comprising a first chamber for holding the first volume of ammonium sulfate solution, a second chamber for holding the second volume of ammonium sulfate solution, and the screen, the screen forming a partition between the first chamber and the second chamber, and wherein the process comprises:
   introducing the feed suspension into the first chamber,
   withdrawing the permeate suspension from the second chamber, and
   withdrawing the product suspension from the first chamber.

4. Process according to claim 3, wherein the process comprises controlling the flow rate of the feed suspension fed to the first side of the screen, the flow rate of the permeate suspension withdrawn from the second volume of ammonium sulfate solution and/or the flow rate of the product suspension withdrawn from the first volume of ammonium sulfate solution, while simultaneously maintaining the first and second sides of the screen immersed in contact with the ammonium sulfate solution.

5. Process according to claim 1, wherein the feed suspension which is fed to the screen comprises less than 25 vol.% ammonium sulfate crystals.

6. Process according to claim 2, wherein the product suspension which is withdrawn from the screen comprises less than 50 vol.% ammonium sulfate crystals.

7. Process according to claim 1, wherein transport of the suspension to the first side of the screen is in a direction essentially parallel to the screen.

8. Process according to claim 7, wherein transport of the suspension to the first side of the screen is at a rate of at least 0.01 m/s in a direction parallel to the screen.

9. Process according to claim 1, wherein the process comprises wiping off ammonium sulfate crystals from the first side of the screen with a mechanical wiper.

10. Process according to claim 9, comprising providing a screening apparatus comprising a first chamber for holding the first volume of ammonium sulfate solution, a second chamber for holding the second volume of ammonium sulfate solution and the screen, the screen forming a partition between the first chamber and the second chamber, and wherein the mechanical wiper is inside the first chamber.

11. Process according to claim 10, wherein at least part of the wall of the first chamber forms a cylinder which includes, at least part of the screen, wherein the mechanical wiper is inside the first chamber and rotatable around an axis parallel to a length axis of the cylinder.

12. Process according to claim 1, wherein step (a) is practiced so as to prevent contact of the openings of the screen with air.

13. Process according to claim 3, wherein the permeate suspension is withdrawn from the second chamber at an end thereof which is proximate to an end of the first chamber into which the feed suspension is introduced and wherein the product suspension is withdrawn from the first chamber at an end thereof remote from the end into which the feed suspension is introduced.

14. Process according to claim 1, wherein the openings of the screen comprise slits.

15. Process according to claim 14, wherein the feed suspension is introduced into an inner tube which comprises the screen, and wherein the slits have a longitudinal dimension which is oriented parallel to a longitudinal direction of the inner tube.

16. Process according to claim 1, wherein the feed suspension which is fed to the screen comprises less than 50 vol.% ammonium sulfate crystals.

17. Process according to claim 2, wherein the product suspension which is withdrawn from the screen comprises less than 70 vol.% ammonium sulfate crystals.

* * * * *